United States Patent [19]
Sakamoto et al.

[11] Patent Number: 5,222,465
[45] Date of Patent: Jun. 29, 1993

[54] VALVE TIMING CONTROL SYSTEM FOR ENGINE

[75] Inventors: Katsuhiko Sakamoto; Toshiya Kan, both of Higashihiroshima, Japan

[73] Assignee: Mazda Motor Corporation, Hiroshima, Japan

[21] Appl. No.: 859,019

[22] Filed: Mar. 30, 1992

[30] Foreign Application Priority Data

Mar. 28, 1991 [JP] Japan .................. 3-064943

[51] Int. Cl.$^5$ .............................................. F01L 1/34
[52] U.S. Cl. ............................... 123/90.15; 123/90.17
[58] Field of Search ................ 123/90.15, 90.16, 90.17

[56] References Cited

U.S. PATENT DOCUMENTS

| | | | |
|---|---|---|---|
| 4,716,863 | 1/1988 | Pruzan | 123/90.15 |
| 4,917,057 | 4/1990 | Seki | 123/90.16 |
| 4,942,851 | 7/1990 | Kawamura | 123/90.15 |
| 5,009,203 | 4/1991 | Seki | 123/90.15 |
| 5,042,436 | 8/1991 | Yamamoto et al. | 123/90.15 |
| 5,046,461 | 9/1991 | Kanehiro et al. | 123/90.15 |
| 5,103,780 | 4/1992 | Ishii | 123/90.15 |
| 5,133,310 | 7/1992 | Hitomi et al. | 123/90.15 |
| 5,140,955 | 8/1992 | Sono et al. | 123/90.15 |

FOREIGN PATENT DOCUMENTS 63-162910  7/1988  Japan .

*Primary Examiner*—E. Rollins Cross
*Assistant Examiner*—Weilun Lo
*Attorney, Agent, or Firm*—Keck, Mahin & Cate

[57] ABSTRACT

A valve timing control system for varying a valve timing determines whether an engine operating condition falls within a specific valve timing range established for a specific valve timing or a standard valve timing range, other than the specific valve timing range, established for a standard valve timing. A valve timing device is activated so as to change a valve timing to the standard valve timing when the engine operates in the standard valve timing range. The valve timing device is also deactivated so as to change a valve timing to the specific valve timing when the engine operates in the specific valve timing range.

5 Claims, 3 Drawing Sheets

VALVE TIMING CONTROL SYSTEM FOR ENGINE

BACKGROUND OF THE INVENTION

1. Field of the Invention

The present invention relates to an electrically operated variable valve timing control system for an automobile engine which alters the timing at which valves are opened and closed in accordance with driving conditions.

2. Description of Related Art

Some electrically operated variable valve timing control devices of this kind change the timing at which engine valves are opened and closed by electrically operated components via the application and release or interruption of electric voltage. For example, Japanese Unexamined Patent Publication No. 63-162,910 describes a valve timing adjustment device which is equipped with an electrically operated retarder or valve timing adjustment device capable of applying and releasing pressure to, or energizing and de-energizing, a valve timing advancing ring for altering the valve timing between two different valve timings.

Such a valve timing adjustment device has an advancing component, such as an advancing control ring, movable within specified limits in an axial direction of a camshaft for driving valves in a timed manner. The control ring is operationally connected to a hub mounted to the camshaft and to a rotary input member, such as a sprocket, cooperating with an engine crankshaft. Axial movement of the advancing control ring causes a relative rotation between the hub and the rotary input member. An advancing ring and the hub, which are connected to the advancing control ring so as to rotate relative to each other, are threadingly coupled. The valve timing adjustment device further has a stationary or non-rotatable retarder, which may include an electro-magnetic coil, which is placed so as to face the advancing ring. When electric voltage is applied to the electro-magnetic retarder, the retarder is forced by the electro-magnetic force to press against the advancing ring, applying braking force onto the advancing ring, causing only a specified angle of relative rotation of the advancing ring. With this relative rotation of the advancing ring, the advancing control member moves in the axial direction of the cam shaft, so that the rotational phase of the cam shaft is altered or retarded with respect to the rotation of the rotary input member. In such a way, the timing at which intake valves or exhaust valves are opened and closed is altered between when electric voltage is applied to the electro-magnetic retarder and when electric voltage is released or withdrawn.

For altering a valve timing, it is typical to install a variable valve timing device so as to drive or open and close valves, for instance intake valves, at different valve timings. Such valve timings may include a standard valve timing, which is identical to a general valve timing of a fixed valve drive mechanism, and a specific valve timing, retarded a specific time with respect to the standard valve timing so as to cause a decrease in compression volume. The intake valves are opened and closed at the specific valve timing when the engine operates in a range of engine operating conditions in which an improvement in fuel consumption is especially demanded. When incorporating an electrically operated variable valve timing device, such as an electro-magnetic retarder, it is typical to withdraw electric voltage from the device in order to establish the normally required standard valve timing and to impress or apply voltage to the device so as to establish the specific valve timing which is less frequently required.

However, if the electrically operated variable valve timing device is thus structured, even if a pumping loss is reduced by operating the intake valves at the specific valve timing in a range of engine operating conditions in which improved fuel consumption is required, an improvement in fuel consumption is not always accomplished. This is due to the consumption of electric power for electrically operating the variable valve timing device. In addition, improvements must be made in enlarging a range in which pumping losses should be reduced, efficiently performing deceleration in a range in which deceleration is required, reducing torque shocks, etc.

SUMMARY OF THE INVENTION

It is an object of the present invention to provide a valve timing control system for automobile engines which can improve fuel consumption in a range of engine operating conditions in which a valve timing is changed from a normal to a specific valve timing.

It is another object of the present invention to provide a valve timing control system for automobile engines which can improve deceleration performance of the engine.

In order to achieve these objects, a valve timing control system in accordance with a preferred embodiment of the present invention for an engine of an automotive vehicle alters a valve timing at which intake valves are opened and closed between two different timings in a particular manner. The control system includes electrically controlled variable valve timing adjusting means, which varies a valve timing between a standard valve timing and a specific valve timing at which pumping loss of the engine is reduced as compared to the standard valve timing. For these different valve timings, a specific valve timing range of engine operating conditions for the specific valve timing and a standard valve timing range of engine operating conditions, other than the specific valve timing range, for the standard valve timing are established.

The specific valve timing range is defined by a predetermined lower load boundary with the standard valve timing range. The specific valve timing range is located on a side of the boundary at which lower air charging rates are present and below a predetermined low load line. The predetermined low load line represents minimum air charging rate necessary to provide an engine output which balances running resistance for an engine speed at which the automotive vehicle is traveling. The lower load boundary is adjacent higher loads, above a predetermined no-load line which represents an air charging rate necessary to provide an engine output for an engine speed at which the engine operates without any load. The specific valve timing range is further defined by a predetermined higher load boundary with the standard valve timing range which is adjacent higher air charging rates above the predetermined low load line and by a predetermined engine speed.

Specifically, the electrically controlled variable valve timing adjusting means is energized so as to vary a valve timing to the standard valve timing when an engine operating condition of the engine is in a standard valve timing range of engine operating conditions. The valve timing adjusting means is de-energized so as to vary a valve timing to the specific valve timing when an engine operating condition of the engine is in a specific valve timing range of engine operating conditions.

In the valve timing control system of this invention, electrical power consumption is reduced due to de-energization of the electrically controlled variable valve timing adjusting means. Also, pumping loss is reduced by establishing the specific valve timing in the specific range of engine operating conditions which constitutes a normal engine operating range. In addition, since the border between the specific valve timing range and the standard valve timing range is established adjacent lower loads rather than the low load line which represents a minimum air charging rate necessary to provide an engine output which balances running resistance for an engine speed at which the automotive vehicle is traveling, a range of engine operating conditions in which pumping loss is reduced is expanded and engine braking performance of the engine is elevated. This is at least partly due to an electrical load caused by applying electrical voltage to, or energizing, the electrically controlled variable valve timing adjusting means. Such advantages are also due to a reduction in pumping loss in a range defined on a side of lower load rather than by the border.

BRIEF DESCRIPTION OF THE DRAWINGS

The above and other objects and features of the present invention will be apparent to those skilled in the art from the following description of a preferred embodiment thereof when considered in conjunction with the appended drawings, in which.

DETAILED DESCRIPTION OF THE PREFERRED EMBODIMENT

Figure 1:
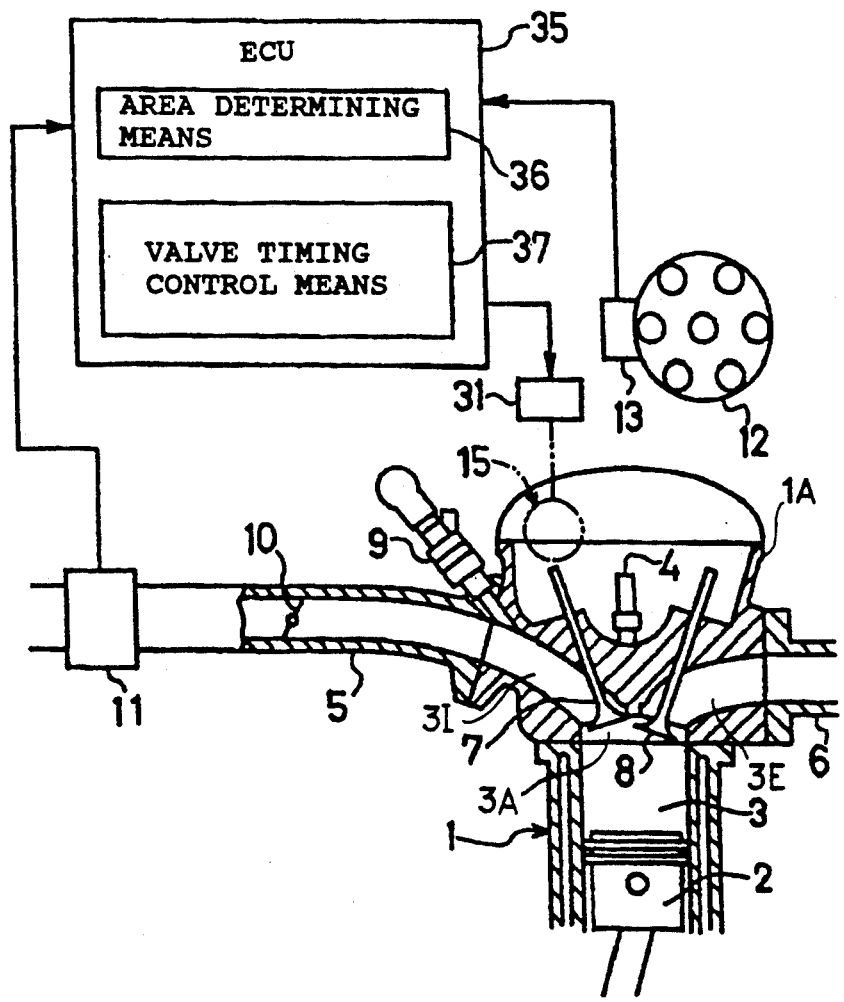
FIG. 1 is a schematic illustration of a valve timing control device in accordance with a preferred embodiment of the present invention.

Referring to the drawings in detail and, in particular, to FIG. 1, an internal combustion engine 1 having a valve timing which is controlled by a variable valve timing control system in accordance with a preferred embodiment of the present invention is shown. The engine 1 has a plurality of cylinders 3 in which pistons 2 can slide up and down or reciprocate. A combustion chamber 3A is formed above the piston 2 within each cylinder 3 of the engine 1. A spark plug 4 is fitted so as to place its projecting core nose (not shown) within the combustion chamber 3A. The cylinder is formed with an intake port 3I and an exhaust port 3E which open into the combustion chamber 3A and are opened and shut or closed at a predetermined timing by an intake valve 7 and an exhaust valve 8, respectively. The engine 1 is provided with an intake passage 5, in communication with the intake port 3I of the engine 1, through which intake air is introduced into the cylinder 3, and an exhaust passage 6, in communication with the exhaust port 3E, through which exhaust gases are discharged.

In the intake passage 5, there are provided a fuel injection valve 9 in the vicinity of the intake port 3I, a throttle valve 10 and an air flow sensor or meter 11, in this order from the downstream side of the intake passage 5. All of the elements 9, 10 and 11 may be of any type well known in structure and operation. In addition, provided in association with the engine 1 is an engine speed sensor 13, which cooperates with a distributor 12 to detect engine speed in terms of the number of rotations per second of a rotor of the distributor 12. A variable valve timing mechanism 15, which includes an electrically operated component, is installed in a valve drive mechanism (which is well known in the art) for, for instance, varying a valve timing at which the intake valves 7 are opened and shut or closed.

Figure 2:
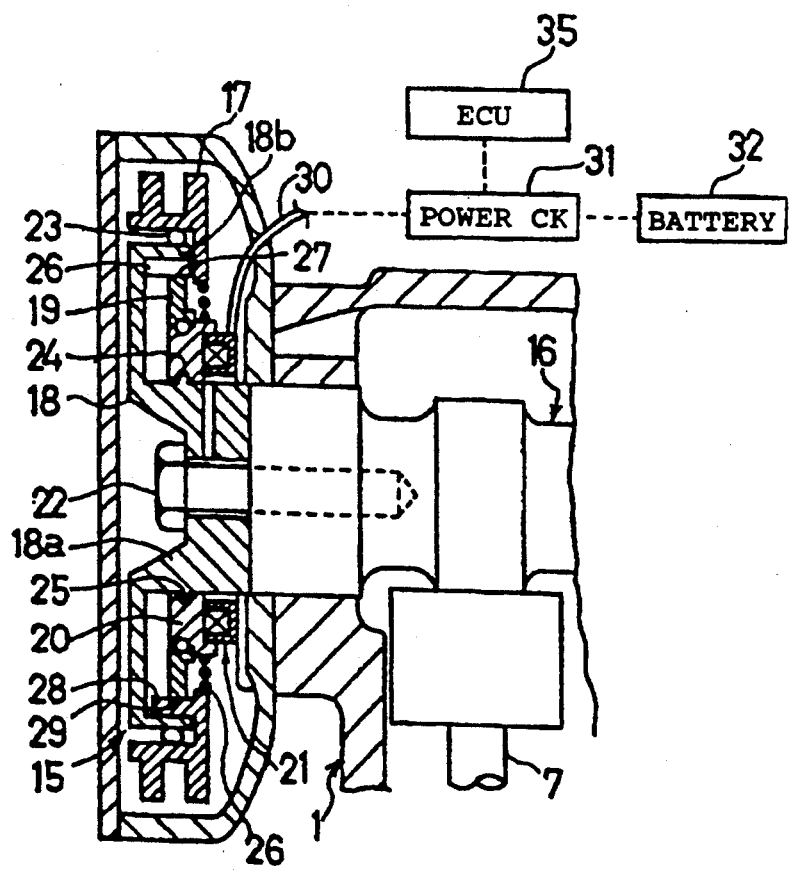
FIG. 2 is a cross-sectional view showing a valve timing varying mechanism.

FIG. 2 shows details of the variable valve timing mechanism 15. The variable valve timing mechanism 15 is installed between an end of an intake camshaft 16 for driving the intake valves 7 and is supported for rotation by an upper section of a cylinder head 1A (see FIG. 1) of the engine 1. A rotation input member, such as a driven sprocket 17, is operationally coupled to the intake camshaft 16 for transmitting the engine output from the engine crankshaft to the valve drive mechanism. The variable valve timing mechanism 15 includes a hub 18, an outer advancing ring 19, an inner advancing ring 20 and a motion control ring 21.

Hub 18 contains a hub main body 18a with an integral flange 18b extending radially outward. The hub 18 is fastened to the end of the intake camshaft 16 by a bolt 22. The driven sprocket 17 is externally installed or mounted on the flange 18b of the hub 18 through a bearing 23 so as to rotate relative to the hub 81. The inner advancing ring 20 is screwed onto the hub body 18a. For screwing the inner advancing ring 20 onto the hub body 18, the hub body and the inner advancing ring 20 are formed with external or male threads 24 and internal or female threads 25. The range of rotation of the inner advancing ring 20 relative to the hub 18 is defined by a stopper (not shown). Between the driven sprocket 17 and the hub 18, there is provided a return spring 26 for elastically restricting the positional relationship between the driven sprocket 17 and the hub 18. The outer advancing member 19 is mounted on the inner advancing ring 20 so that rotation relative to inner advancing ring 20 is allowed but relative movement in the axial direction with respect to the camshaft is not allowed. The outer advancing ring 19 is formed with an external groove 27, extending in a straight line parallel to the axis of the camshaft 16, which receives an internal key 26 formed in the flange 18b of the hub 18. The ring 19 also includes an external groove 29, extending helically with respect to the axis of the camshaft 16, which receives an internal key 28, formed within the driven sprocket 17. By using such structures for the outer and inner advancing rings 19 and 20, when the outer advancing ring 19 is forced in the axial direction, there is no relative rotation between the outer advancing ring 19 and the hub 18. However, there is relative rotation between the outer advancing ring 19 and the hub 18, which are united in rotation, and the driven sprocket 17.

Motion control ring 21, which may be an electromagnetic coil, is loosely mounted on the hub body 18a of the hub 18 and held within and by the cylinder head 1A. The motion control ring 21, therefore, faces the end surface of the inner advancing ring 20 and is not allowed to rotate with respect to the cylinder head 1A, but is allowed to move in the axial direction. Lead wire 30 is connected to the electro-magnetic coil of the motion control ring 21 and is drawn outside the cylinder head 1A. When the electro-magnetic coil of the motion control ring 21 is stimulated or energized, it applies a pressure to the inner advancing ring 20 and forces it to move. On the other hand, when electricity is disconnected to de-energize the electro-magnetic coil of the motion control ring 20, the motion control ring 21 removes the pressure from the inner advancing ring 20.

As the engine 1 operates, the driven sprocket 17, the hub 18, the outer advancing ring 19 and the inner advancing ring 20 are driven as one unit. During engine operation, when the electro-magnetic coil of the motion control ring 21 is energized, the motion control ring 21 forces the inner advancing ring 20 to move in the axial direction, causing the inner advancing ring 20 to rotate relative to the hub 18 due to the effect of braking force created between the inner advancing ring 20 and the motion control ring 21. As a result, the inner advancing ring 20 is displaced in its angular position by a predetermined allowed angle. Simultaneously, the outer advancing ring 19 and the inner advancing ring 20 move together in the axial direction by a predetermined distance, depending upon the helical groove 29. When the electro-magnetic coil of the motion control ring 21 is de-energized, all of the movable elements, namely, the driven sprocket 17, the hub 18, the outer advancing ring 19 and the inner advancing ring 20, are forced by the return spring 26 to move back to the original positions which they occupied before the electro-magnetic coil of the motion control ring 21 was energized. In this way, between the energization and de-energization of the electro-magnetic coil of the motion control ring 21, the phase of rotation of the intake camshaft 16 is changed relative to that of the driven sprocket 17, so that a valve timing of opening and closing the intake valves is varied.

Figure 3:
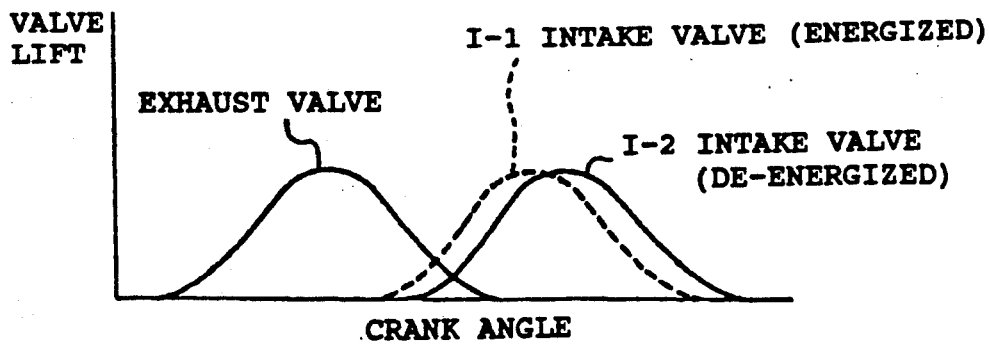
FIG. 3 is a diagram showing valve opening and closing timing in terms of valve lift and crank angle.

Referring to FIG. 3, an alternation of valve timing, depending upon the energization and de-energization of the electro-magnetic coil of the motion control ring 21, is shown. A valve lift curve with respect to crank angle for the intake valve shown by a dotted curve I-1 defines a standard intake valve opening and closing timing (which is hereafter referred to as a standard valve timing for simplicity). The dotted curve I-1 represents a general intake valve opening and closing timing when no consideration is made to any reduction in pumping loss. A valve lift curve with respect to crank angle for the intake valve shown by the solid curve I-2 defines a specific intake valve opening and closing timing (which is hereafter referred to as a specific valve timing for simplicity) which is retarded by a specific time with respect to the standard valve timing. The specific valve timing is retarded for a sufficient reduction in pumping loss as compared to the standard valve timing. The motion control ring 21, upon energization of its electro-magnetic coil, causes the variable valve timing device 15 to vary the rotational phase of the intake camshaft 16 so as to open and close the intake valves 7 at the standard valve timing. On the other hand, upon de-energization of its electro-magnetic coil, the motion control ring 21 causes the variable valve timing device 15 to vary the rotational phase of the intake camshaft 16 so as to open and close the intake valves 7 at the specific valve timing.

The operation of the variable valve timing device 15 depicted in FIGS. 1 and 2 is controlled by an electronic control unit (ECU) 35, which includes a micro-computer, through an electrical power control circuit 31 connected between the electro-magnetic coil of the motion control ring 21 and a battery 32. The electronic control unit (ECU) 35 receives signals from the air flow sensor 11 and the engine speed sensor 13 and, according to these signals, provides switching control signals to the electrical power control circuit 31. The electrical power control circuit 31 is capable of alternatively energizing and deenergizing the electro-magnetic coil of the motion control ring 21 according to switching control signals from the electronic control unit 35.

Electronic control unit 35 includes a range determining means 36 which determines engine operating conditions to be in either a basic timing range of engine operating conditions, in which the intake valves are opened and closed at the standard valve timing, or a retard or specific timing range of engine operating conditions, in which the intake valves are opened and closed at the specific valve timing. The electronic control unit 35 further includes a valve timing mechanism control means 37 which provides an energization control signal to the electrical power control circuit (Power Circuit) 31 in the standard timing range in accordance with engine operating conditions. The valve timing control means also provides a de-energization control signal to the electrical power control circuit 31 in the specific timing range in accordance with engine operating conditions.

Figure 4:
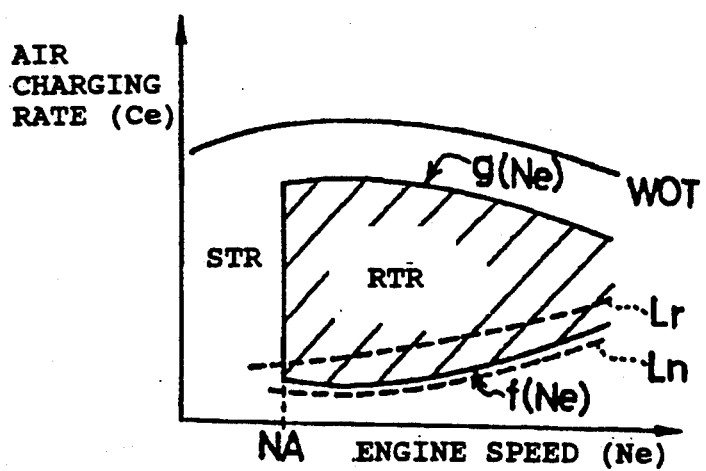
FIG. 4 is a diagram showing a valve timing retard range of engine operating conditions in terms of engine speed and air charging rate.

Referring to FIG. 4, in a memory of the range determining means 36, there is stored a map of data representing valve timing ranges of engine operating conditions in terms of air charging rate and engine speed. The entire range of engine operating conditions is divided into two valve timing ranges, namely, the standard timing range (which is indicated by an abbreviation STR) and the retard or specific timing range (which is indicated by an abbreviation RTR). As is shown by a shaded area in FIG. 4, the specific timing range (RTR) is defined above a predetermined critical engine speed NA and between upper and lower critical load lines g(Ne) and f(Ne). Decreasing pumping loss allows discharged exhaust gases to be aspirated into an intake system, adversely affecting combustion stability of an engine. If a decrease in pumping loss is caused during lower engine speeds, the engine may possibly stall. The engine speed NA is a critical engine speed at which the engine will stall during a decrease in pumping loss. Each load line represents an air charging rate (Ce) expressed as a function of engine speed (Ne). The standard timing range (STR) is established for all areas, other than the specific timing range (RTR), including a lower engine speed range in the vicinity of an idle engine speed, a predetermined deceleration speed range, and a high load operating range in the vicinity of a wide open throttle (WOT) condition, in which a throttle valve is fully opened. The load line f(Ne), which is a border line between the specific timing range (RTR) and the standard timing range (STR) on the side of the deceleration speed range, is established at lower loads than a specific low load line Lr, which represents an air charging rate necessary to provide an engine output which balances a running resistance for a particular vehicle speed at which the vehicle is traveling (a ground running resistance line). For example, in this embodiment, a border formed by the lower critical load line f(Ne) is established at lower loads than the low load line Lr but at higher loads than a no-load line Ln which represents a minimum air charging rate necessary to provide an engine output of the engine 1 while it operates with no load (no load-resistance line). The no-load line represents air charging rates at which an engine operates without any load (caused when a transmission is in its neutral condition and an engine clutch is disconnected). During this no-load engine operation, the engine neither increases nor decreases its speed. All data representative of the critical engine speed (NA), the functions f(Ne) and g(Ne), and the load lines Lr and Ln are stored in the memory of the range determining means 36 of the electronic control unit 35 in advance.

Figure 5:
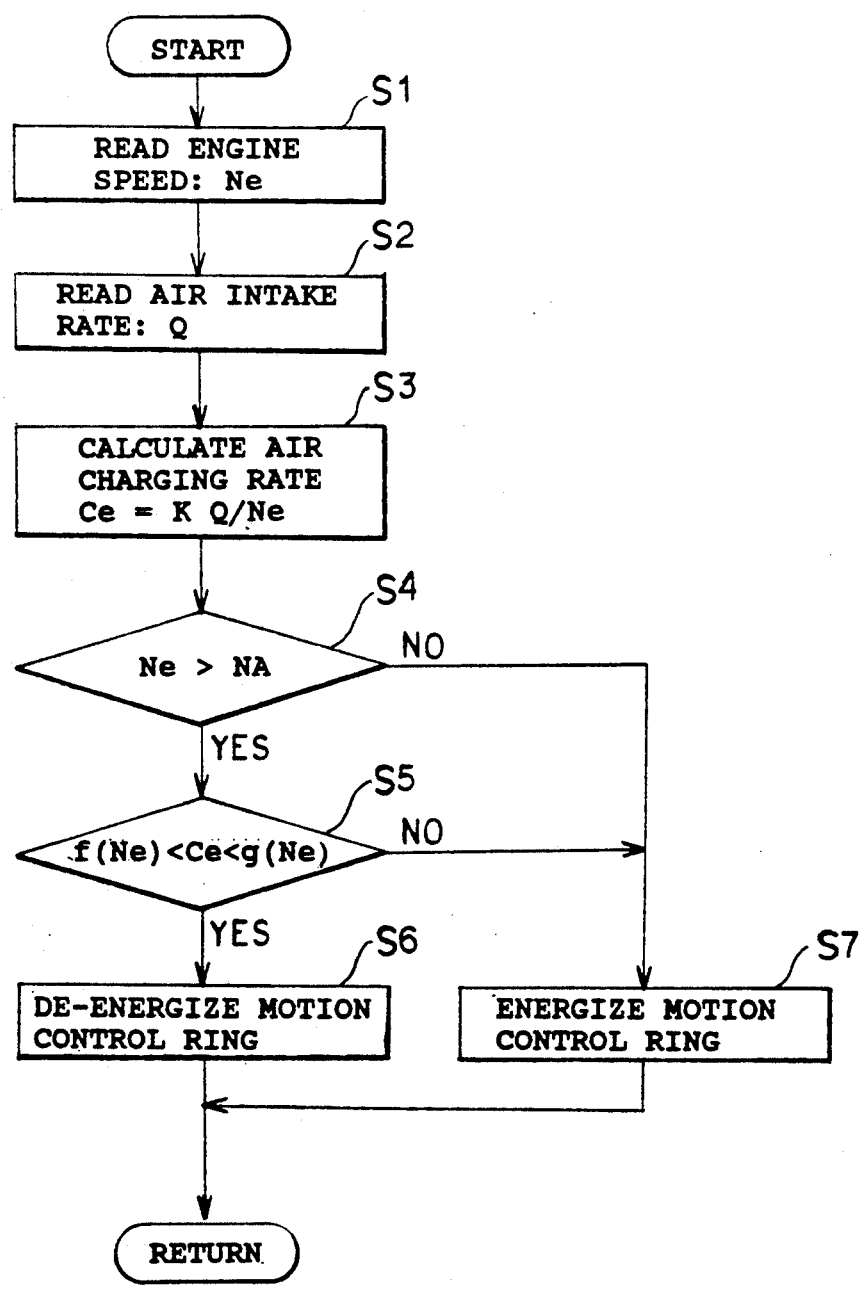
FIG. 5 is a flow chart showing a sequence of valve timing control of the valve timing control system for a micro-computer of an electronic control unit.

The operation of the valve timing control system depicted in FIGS. 1 to 4 is best understood by reviewing FIG. 5, which is a flow chart illustrating a valve timing control sequence for the micro-computer of the electronic control unit (ECU) 35. Programming a computer is a skill well understood in the art. The following description is written to enable a programmer having ordinary skill in the art to prepare an appropriate program for the microcomputer of the electronic control unit 35. The particular details of any such program would, of course, depend upon the architecture of the particular computer selected.

Referring to FIG. 5, illustrating a flow chart representing the valve timing control sequence, it will be recalled from the above description of FIG. 2 that the motion control ring 21, upon energization of its electro-magnetic coil, causes the variable valve timing device 15 to provide a rotational phase to the intake camshaft 16 suitable for the standard valve timing and, upon de-energization of its electro-magnetic coil, causes the variable valve timing device 15 to vary a rotational phase of the intake camshaft 16 so as to retard the valve timing to the specific valve timing.

When the valve timing control commences, the electronic control unit 35 reads a current engine speed (Ne) from the engine speed sensor 13 at step S1, and an intake air rate (Q) from the air flow sensor 11 at step S2. Thereafter, at step S3, an air charging rate (Ce) is calculated from the equation $Ce = K\, Q / Ne$, wherein K represents a predetermined constant. Based on these current operational values for the engine 1, an engine operating condition is checked or evaluated to determine whether it is within the specific timing range (RTR) or the standard timing range (STR).

That is, at step S4, a first decision is made as to whether or not the engine speed (Ne) is higher than the predetermined critical engine speed (NA). When the answer to the first decision is "YES," this indicates that the current engine operating condition is likely to be within the specific timing range (RTR). Then, another decision is made at step S5 as to whether or not the calculated air charging rate (Ce) exists between the upper and lower critical air charging rates for the current engine speed (Ne) determined by the load lines g(Ne) and f(Ne), respectively. If the answer to the decision made at step S5 is "YES," this indicates that the current engine operating condition actually exists within the specific timing range (STR). Then, at step S6, the electronic control unit (ECU) 35 provides a de-energization control signal to the electrical power control circuit 31 so as to shut down electric voltage to the electro-magnetic coil of the motion control ring 21, thereby de-energizing the electro-magnetic coil of the motion control ring 21. If, however, the answer to either the decision made at step S4 or that made at step S5 is "NO," this indicates that the current engine operating condition does not exist within the specific timing range (RTR) but within the standard timing range (STR). Then, at step S7, the electronic control unit (ECU) 35 provides an energization control signal to the electrical power control circuit 31 so as to supply electrical voltage to the electro-magnetic coil of the motion control ring 21, thereby energizing the electromagnetic coil of the motion control ring 21.

According to the valve timing control system of the present invention, in the specific timing range (RTR) shown in FIG. 4, an electrical voltage supplied to the electromagnetic coil of the motion control ring 21 is shut down. Consequently, the valve timing of intake valve opening and closing is retarded. Shutting down an electrical voltage to the electro-magnetic coil of the motion control ring 21 for retarding valve timing greatly reduces fuel consumption. This is due to a reduction in pumping loss by the retarded valve timing and a reduction in electric power consumption. The term "pumping loss" means engine output loss due to intake resistance which is caused from the pressure difference of intake air before and after a throttle valve during an intake stroke.

On the other hand, in order for the engine 1 to maintain combustion stability in a range of engine speeds lower than the predetermined critical engine speed (Ne), and also in order to raise the air charging rate for the engine 1 and, therefore, improve engine output efficiency in a range of engine loads higher than the upper critical load line g(Ne), an actual intake valve opening and closing timing is set to the standard valve timing. In addition, an actual intake valve opening and closing timing is set to the standard valve timing in a range of engine loads lower than the lower critical load line f(Ne), so as to increase pumping loss and apply electrical load during deceleration. As a result, the engine braking performance is increased.

Since the lower critical load line f(Ne) is established below the low load line Lr, a great fuel consumption improvement, due to a reduction in pumping loss and a saving in electric power consumption, is realized even in a wide range of engine operating conditions including a range of lower loads below the low load line Lr. In addition, although generally, if pumping loss and electric load are increased in a range of lower loads, below the no-load line Ln, relative changes in torque become large, so that occupants of the vehicle feel a torque shock which is stronger than is practical, establishing a lower critical load line f(Ne) above the no-load line Ln helps to avoid such torque shock feelings.

In the above-described embodiment, an intake valve opening and closing timing is altered between a standard valve timing and a specific valve timing, which is retarded a specified time with respect to the standard valve timing. In order to reduce pumping loss, the specific valve timing may be advanced a specific time with respect to the standard valve timing. Even in this case, the electromagnetic coil of the motion control ring 21 is de-energized for advancing in the shaded range of engine operating conditions in FIG. 4.

According to the present invention, the variable valve timing mechanism is structured so that it occupies a first position under the action of electric voltage so that it sets a standard valve timing, and a second position when electric voltage is withdrawn so that it sets a specific valve timing suitable for a reduction in pumping loss when engine operating conditions are in a specific range. Consequently, fuel consumption is greatly improved due to a reduction in pumping loss, and electric power is saved during the withdrawal of electric voltage. Furthermore, since the border between the specific timing range of engine operating conditions at reduced speeds is established at lower loads, below a lower critical load line, the performance of engine braking can be elevated by pumping loss and electric load in a range of lower loads below the border, making a range of engine operating conditions which improves fuel consumption even wider. If the border is established at lower loads below the lower critical load line and at higher loads above the no-load line, the engine is prevented from causing stronger than practical torque changes which will be felt by a passenger of the vehicle during deceleration, without losing performance by reduction of engine speed.

In order to decrease pumping loss, it is also effective to advance exhaust valve timing. However, advancing an exhaust timing is disadvantageous in that it prevents an expansion stroke from being fully available and, therefore, can weaken engine output. Nonetheless, although retarding an intake valve timing is more effective than advancing an exhaust valve timing, the claims should not considered to be limited to intake valve retardation.

It is to be understood that although the present invention has been described in detail with respect to a preferred embodiment thereof, various other embodiments and variants may occur to those skilled in the art. Those other embodiments and variants which fall within the scope and spirit of the invention are intended to be covered by the following claims.

What is claimed is:

1. A valve timing control system for an engine of an automotive vehicle for varying a valve timing at which intake valves are opened and closed between two different timings comprising:

engine operating condition detecting means for detecting at least an intake air rate for the engine and an engine speed;

electrically controlled variable valve timing adjusting means for altering the valve timing between a standard valve timing and a specific valve timing at which pumping loss of the engine is reduced as compared to a pumping loss at said standard valve timing; and control means for deciding whether an engine operating condition is a specific valve timing range of engine operating conditions, established for said specific valve timing, or a standard valve timing range of engine operating conditions, other than said specific valve timing range, established for said standard valve timing, and for energizing said electrically controlled variable valve timing adjusting means so as to set said valve timing to said standard valve timing when it is decided that an engine operating condition of the engine is in said standard valve timing range and de-energizing said electrically controlled variable valve timing adjusting means so as to set said valve timing to said specific valve timing when it is decided that an engine operating condition of the engine is in said specific valve timing range, said specific valve timing range being defined by a predetermined lower load boundary with said standard valve timing range which is on a side of lower air charging rates below a predetermined low load line which represents an air charging rate necessary to provide an engine output balancing running resistance for an engine speed, detected by said engine operating condition detecting means, at which the automotive vehicle is traveling.

2. A valve timing control system as recited in claim 1, wherein said predetermined lower load boundary is on a side of higher loads above a predetermined no-load line which represents an air charging rate necessary to provide an engine output for an engine speed, detected by said engine operating condition detecting means, at which the engine operates with no load.

3. A valve timing control system as recited in claim 1, wherein said specific valve timing range is defined by a predetermined engine speed.

4. A valve timing control system as recited in claim 1, wherein said specific valve timing range is defined by a predetermined higher load boundary with said standard valve timing range which is on a side of higher air charging rates above said predetermined low load line.

5. A valve timing control system as recited in claim 1, wherein said air charging rate is determined based on an intake air rate and an engine speed, both of which are detected by said engine operating condition detecting means.

* * * * *